United States Patent
You et al.

(10) Patent No.: US 7,079,516 B2
(45) Date of Patent: Jul. 18, 2006

(54) ADAPTIVE FREQUENCY HOPPING APPARATUS IN WIRELESS PERSONAL AREA NETWORK SYSTEM

(75) Inventors: Young-Hwan You, Kyunggi-do (KR); Cheol-Hee Park, Seoul (KR); Min-Chul Ju, Kyunggi-do (KR); Kee-Hyun Park, Kyunggi-do (KR); Jin-Woong Cho, Kyunggi-do (KR)

(73) Assignee: Korea Electronics Technology Institute, Kyunggi-do (KR)

( * ) Notice: Subject to any disclaimer, the term of this patent is extended or adjusted under 35 U.S.C. 154(b) by 929 days.

(21) Appl. No.: 10/083,119

(22) Filed: Feb. 27, 2002

(65) Prior Publication Data

US 2003/0031231 A1 Feb. 13, 2003

(30) Foreign Application Priority Data

Jul. 4, 2001 (KR) ................ 2001-39875

(51) Int. Cl.
*H04B 7/212* (2006.01)

(52) U.S. Cl. ................ 370/337; 370/321; 370/347; 370/442; 370/465; 375/132; 375/133

(58) Field of Classification Search ........ 370/337, 370/321, 347, 442, 465, 464, 29, 951, 95.3, 370/1, 100.1, 441, 277, 280, 310, 310.2, 370/314, 326, 328, 332, 333, 376, 395.6, 370/437, 443, 458, 335, 503, 350; 455/34.1, 455/56.1, 75–76, 88, 361; 379/61, 58, 62; 340/825.2, 825.14; 375/133, 130, 138, 272, 375/303, 334, 202, 203, 205, 1, 354, 362, 375/364, 132–137

See application file for complete search history.

(56) References Cited

U.S. PATENT DOCUMENTS

| 5,323,447 | A | * | 6/1994 | Gillis et al. ............. 455/464 |
| 5,418,839 | A | * | 5/1995 | Knuth et al. ............ 455/464 |
| 5,590,410 | A |   | 12/1996 | Deutsch et al. ........... 455/76 |
| 5,848,095 | A | * | 12/1998 | Deutsch .................. 375/133 |
| 6,275,517 | B1 |  | 8/2001 | Izumi ..................... 375/133 |

OTHER PUBLICATIONS

Adaptive timing synchronization schemes for a short-ranged Bluetooth system. Young-Hwan You; Min-Chul Ju; Jong-Ho Paik; Jin-Woong Cho; Hyoung-Kyu Song. Consumer Electronics, IEEE Transactions on vol. 46 Issue: Aug. 3, 2000, pp. 690-696.*

WLAN technologies for mobile ad hoc networks. Bruno, R.; Conti, M,; Gregori, E.; System Sciences, 2001. Proceedings of the 34th Annual Hawaii International (Jan. 3-6, 2001 p. 11 pp.*

Adaptive Frequency Hopping Implementation Proposals for IEEE 802.15. 1/2 WPAN. Hongbing Gan, Bijan Treister. Bandspeed Pty Ltd, Nov. 2000. doc.: IEEE 802.15-00/367r0.*

* cited by examiner

*Primary Examiner*—Frank Duong
*Assistant Examiner*—Jamal A. Fox
(74) *Attorney, Agent, or Firm*—Bacon & Thomas, PLLC

(57) ABSTRACT

The present invention relates to an adaptive frequency hopping apparatus in a wireless personal area network (WPAN) system, wherein predetermined packets of data can be correctly transmitted by estimating the channel qualities of operating bands in advance and transmitting the packets through a proper band.

1 Claim, 4 Drawing Sheets

ADAPTIVE FREQUENCY HOPPING APPARATUS IN WIRELESS PERSONAL AREA NETWORK SYSTEM

BACKGROUND OF THE INVENTION

1. Field of the Invention

The present invention relates to an adaptive frequency hopping apparatus in a wireless personal area network (hereinafter, abbreviated to "WPAN") system for estimating the channel qualities of operating bands in the WPAN system to transmit packets through an appropriate band.

2. Description of the Prior Art

A WPAN system operates in the 2.4 GHz frequency band and includes a Bluetooth system, a Wireless Local Area Network (WLAN) and the like which are well known. The Bluetooth system performs the transmission and reception of data by using a frequency hopping scheme, and the WLAN system performs them by employing the frequency hopping scheme and a direct band spread scheme.

Further, the Bluetooth system performs the frequency hopping for all the bands by using 79 bands of the RF frequency, and particularly, a frequency hopping system of the Bluetooth system performs independently the frequency hopping with the same probability throughout the entire bands irrespective of the bands used by the other WPAN apparatuses.

Therefore, upon transmission and reception of predetermined data, the Bluetooth system produces a frequency interference with the other WPAN apparatuses using the same frequency band.

In particular, due to low power transmission of the Bluetooth system, if a WPAN apparatus having high power transmission operates around the Bluetooth system, the Bluetooth system fails to transmit a packet at the same frequency at that time.

SUMMARY OF THE INVENTION

An object of the present invention is to provide an adaptive frequency hopping apparatus in a WPAN system for allowing predetermined packets of data to be correctly transmitted by estimating the channel qualities of operating bands in advance and transmitting the packets through an appropriate band.

In an adaptive frequency hopping apparatus according to the present invention, a master unit and active slave units, which form a piconet when they are connected with one another, transmit and receive data in 625 μs time slots assigned in accordance with a Time Division Duplex (TDD) scheme. The respective time slots are numbered in accordance with the Bluetooth clocks of the master unit, and the master unit and slave units basically allow respective receivers to operate in odd-and even-numbered time slots, respectively.

The receivers of the master unit and the slave units in the piconet operate $N_{scan}$ ($N_{scan} \geq N_h$) times during a predetermined time interval $T_{scan}$ ($T_{scan} \geq 1.25$ ms×$N_h$, $N_h$=79) for Nh hop frequency bands. Each receiver monitors the channel quality using the output of an access code (AC) correlator forming the receiver and using the result of detection of a received signal strength indication (RSSI) signal, and stores the information on the channel quality for each 1 MHz band which has been accumulated $N_{scan}$ times, in its own frequency table.

An adaptive frequency hopping controller accumulates the information on the channel quality, i.e. a good or bad channel, for each channel generated by a frequency hopping transceiver among $N_h$ RF channels included in the frequency tables every time slots. The master unit collects frequency tables of each slave unit for all $N_h$ RF channels every $T_{scan}$ interval, and analyzes the information on the qualities for the RF channels in the piconet.

In general cases, the frequency tables of each slave unit may have different information on the qualities of the RF channels. Therefore, the master unit performs the determination of the qualities for the $N_h$ RF channels by integrating the frequency tables collected from the K slave units and then divides them into $N_g$ good channels and $N_b$ ($N_h = N_g + N_b$) bad channels using the majority logic. The master unit transmits updated frequency tables for the RF channels to the respective slave units using a link manager protocol. These processes are repeated at the $T_{scan}$ interval.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE INVENTION

Hereinafter, the present invention will be described in detail with reference to the accompanying drawings.

Figure 1:
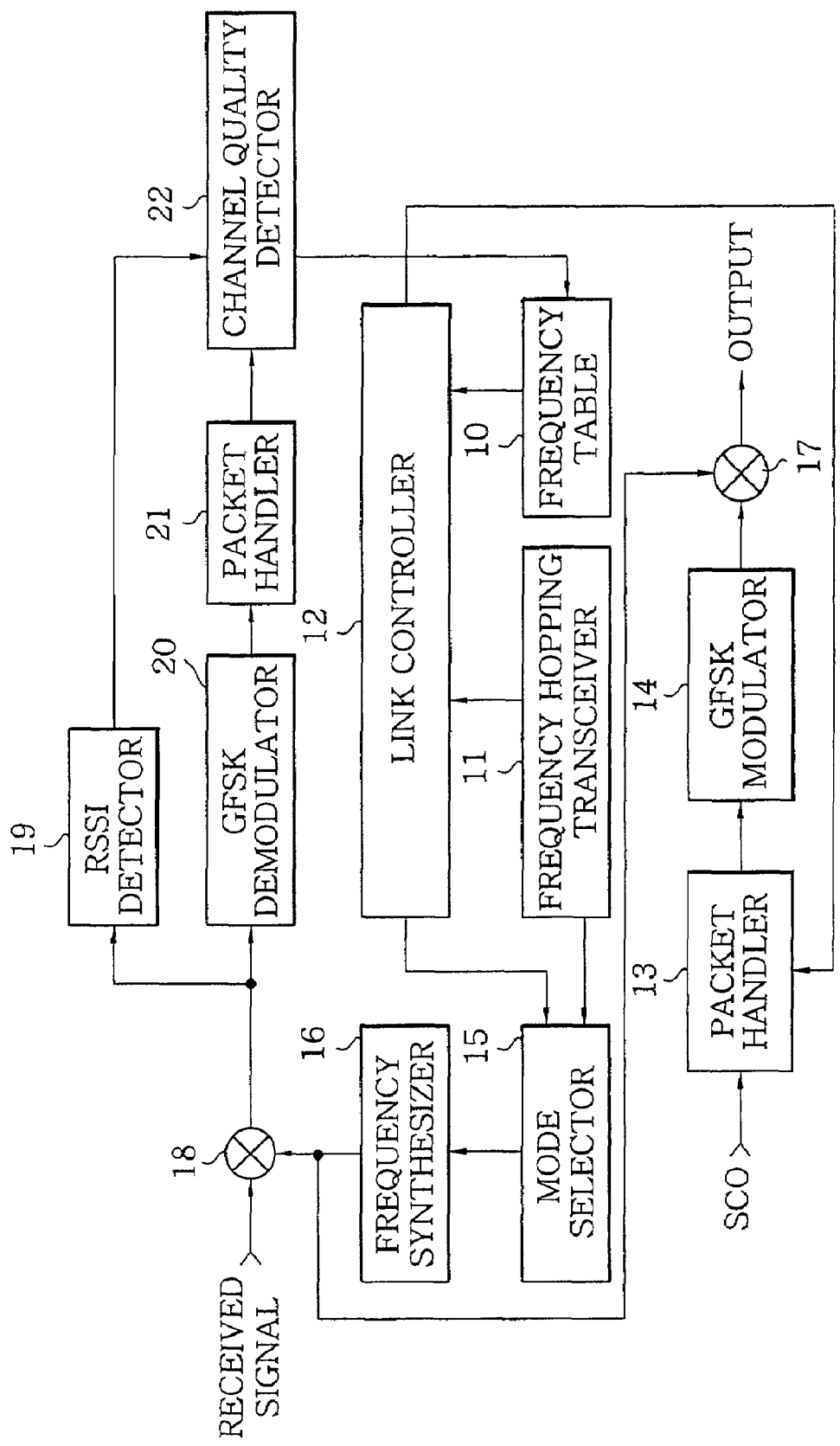
FIG. 1 is a block diagram showing a configuration of the adaptive frequency hopping apparatus according to the present invention.

FIG. 1 is a block diagram showing the configuration of an adaptive frequency hopping apparatus according to the present invention. As shown in FIG. 1, the adaptive frequency hopping apparatus comprises a frequency table 10 for monitoring the current qualities of channels for 79 frequency bands, and storing and outputting information on the channel quality for each 1 MHz frequency band accumulated $N_{scan}$ times, a frequency hopping transceiver 11 for generating and outputting a frequency pattern in accordance with predetermined rules, a link controller 12 for generating an asynchronous connectionless (ACL) link, which is text data, in accordance with output signals of the frequency table 10 and the frequency hopping transceiver 11 and controlling selection of an operating mode between a channel avoidance scheme and a channel selection scheme, a packet handler 13 for generating packet data by integrating a synchronous connection oriented (SCO) link and the ACL link inputted therein, a gaussian frequency shift keying (GFSK) modulator 14 for performing GFSK modulation for signals outputted from the packet handler 13, a mode selector 15 for selecting the operating mode between the channel avoidance scheme and the channel selection scheme in accordance with the output signals of the frequency hopping transceiver 11 and the link controller 12, a frequency synthesizer 16 for synthesizing frequencies in accordance with output signals of the mode selector 15, a first multiplier 17 for mixing signals from outputted from the frequency synthesizer 16 and the GFSK modulator 14, and for outputting the multiplied signals as transmission signals, a second multiplier 18 for multiplying the output signals of the frequency synthesizer 16 by the receiving signals, an RSSI detector 19 for detecting the RSSI from output signals of the second multiplier 18, a GFSK demodulator 20 for performing GFSK demodulation for the output signals of the second multiplier 18, a packet handler 21 for restoring packet-type data from output signals of the GFSK demodulator 20, and a channel quality detector 22 for estimating the channel quality by using the output signals of the RSSI detector 19 and the packet handler 21 and storing it in the frequency table 10.

In the adaptive frequency hopping apparatus of the present invention having the configuration as described above, upon transmission of the predetermined data, the link controller 12 performs the mode selection for the frequency hopping in accordance with the SCO and ACL links. In addition, the apparatus operates in a frequency-hopping manner corresponding to each link according to the contents stored in the frequency table 10 and the frequency generated at the frequency hopping transceiver 11, as described above. Further, the apparatus performs transmission of the signals at a hop frequency generated by means of the relevant frequency hopping method from the finally modulated signals.

Further, upon reception of the predetermined data, the second multiplier 18 multiplies the received signals by the output signals of the frequency synthesizer 16 to perform the modulation, and then outputs the multiplied signals to both the RSSI detector 19 and the GFSK demodulator 20. The RSSI detector 19 and the GFSK demodulator 20 perform the RSSI measurement and the GFSK demodulation for the signals outputted from the second multiplier 18, respectively.

The packet handler 21 receives the signals demodulated at the GFSK demodulator 20 and restores the data, which have been transmitted thereto, in accordance with the types of packets. Then, the channel quality detector 22 estimates the channel quality using the restored data and the detected RSSI value.

Figure 2:
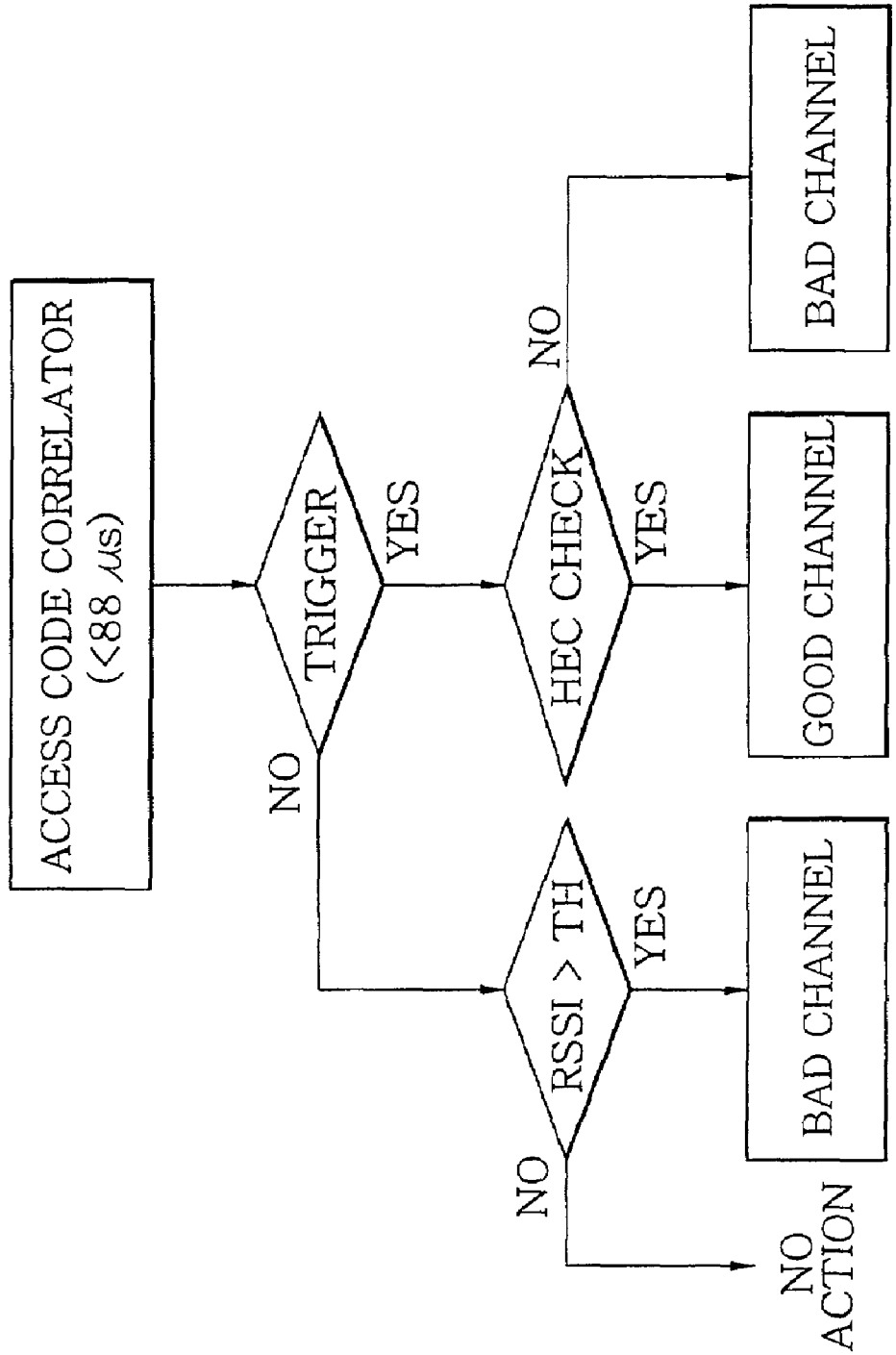
FIG. 2 is a flowchart showing the operation of the channel quality detector shown in FIG. 1.

The channel quality detector 22 operates as shown in FIG. 2. If the access code correlator is triggered, the channel quality detector 22 checks a header error check (HEC). If there is not the HEC, the channel quality detector 22 estimates the channel as a good channel, and if there is the HEC, the channel quality detector 22 does the channel as a bad channel.

Meanwhile, if the access code correlator is not triggered, the channel quality detector 22 compares the RSSI value with a threshold value Th. As the result of the comparison, if the RSSI value is larger than the threshold value Th, the channel quality detector 22 estimates the channel as a bad channel, and if not, the channel quality detector 22 do not operate any longer.

Furthermore, even at a receiving end, a relevant frequency hopping method is selected by comparing the contents registered in the frequency table 10 with the frequency generated at the frequency hopping transceiver 11 in accordance with the types of the transmitted packets. The signals are restored at a hop frequency generated by means of the relevant frequency hopping method from the finally received signals.

That is, in case of the ACL link, the master unit and the slave units in the piconet adopt the channel selection scheme in which a long packet is assigned to a good channel and a short packet is assigned to a bad channel by using the registered frequency table 10. Meanwhile, in case of the SCO link, the channel avoidance scheme, in which voice information is transmitted through a good channel by avoiding a bad channel where the interference exists, is adopted.

Hereinafter, the channel selection scheme will be described in detail.

The channel selection scheme maximizes the data throughput of total users by transmitting data of the users as little as possible using a segment type 1 or 2 packet for RF channels with high packet error probability, and transmitting a segment type 3 or 4 packet for RF channels with good quality.

In a process of packetizing the data of the user to be transmitted, the ACL link can generate a proper type of packet by comparing the sequence of the frequency hopping transceiver 11 with the quality of the RF channel stored in the frequency table 10. That is, in case of the frequency band corresponding to the bad channel, a short packet of 1 time slot, such as $DM_1$ (DM: Data Medium) of segment type 1, which ⅔ forward error check (FEC) is applied is generated. In case of the good channel, a relatively long packet of 3 or 5 time slots such as $DH_3$ (DH: Data High), $DH_5$, $DM_3$ and $DM_5$ of segment type 3 and segment type 4 is assigned thereto.

This channel selection scheme of the ACL link is performed using a link manager and a link controller of the Bluetooth unit which controls the generation of the packets.

Generally, while a connection is established, the transmitters and the receivers of the master unit and the slave units hop onto new frequencies at every 625 µs. A channel is divided into 625 µs time slots according to the clocks of the master unit, and each time slot is numbered. According to the TDD scheme, the master unit transmits the data in even-numbered time slot and the slave units transmit the data in odd-numbered time slot. The link controller of the master unit and the slave unit obtain the channel quality information from the frequency table for the hop frequency generated at the frequency hopping transceiver at each transmission time slot. The link controller transfers the information on the quality of the RF channel to the link manager. Furthermore, the channel selection scheme may be used in association with a power control scheme of the Bluetooth. A receiving Bluetooth unit can request a counterpart unit to increase or decrease the transmission power if difference between the measured RSSI value and the threshold value is large. This power control message is defined in the link manager protocol in the existing Bluetooth specification. In the adaptive frequency hopping method of the ACL link, if the RF channel quality is bad, the packets are transmitted using the channel selection scheme with the increased transmission power. However, the power controlling method is not applied to all bad channels. The power control scheme is used in association with the channel selection scheme when the interference level of the bad channel stored in the frequency table is lower than the threshold value.

Next, the channel avoidance scheme will be described in detail.

Establishing the connection of SCO links, the link manager assigns the slots at intervals of $T_{SCO}$ ($T_{SCO}$ is a unit time in which the master unit and the slave units can hop onto all frequency bands) based on ACL link. Accordingly, since the type of the packet to be used is predetermined, an RF channel changing scheme is more advantageous than the channel selection scheme which changes the type of the packet according to the channel condition.

Upon reception and transmission of the signals, if the RF channel generated at the frequency hopping transceiver 11 is a bad channel stored in the frequency table 10, the frequency band used upon reception and transmission of the signals is determined by changing the hop frequency into the good channel. In the channel selection scheme of the ACL link, a transmitting Bluetooth unit determines the type of the packet by estimating the channel quality of the hop frequency. However, in the channel avoidance scheme, both the transmitting and receiving unit must estimate the channel quality and hop onto an identical RF channel among the good channels. At this time, a good channel mapper determines which channel among the good channels is to be used.

The implementation complexity of the channel avoidance scheme is affected by an implementation method of the good channel mapper. In order to meet the characteristics of the Bluetooth such as simplicity, the good channel mapper is also implemented as a simple architecture which can use the conventional Bluetooth specification. When the hop frequency is a bad channel, the good channel mapper uses a hop frequency that last hopped onto the good channel. Assuming that the frequency band of the interference signals which can interfere with the Bluetooth system is 20–30 MHz, in practice, the probability in which the hop sequence generated at the frequency hopping transceiver 11 will consecutively be assigned to three or more bad channels is low.

Therefore, even if the frequency assigned to the bad channel is replaced with a hop frequency last assigned to the good channel, the random property of the hop sequence is rarely affected.

Upon implementation thereof, the link controller updates only a register for storing the hop frequency last assigned to the good channel, and if the RF channel generated at the frequency hopping transceiver is a bad channel as the result of the comparison with the frequency table, the link controller simply uses the channel stored in the register.

The master unit transmits the $DM_x$ (x=1, 2, 3) packets, and the slave units transmit the $DM_y$ (y=1, 2, 3) packets. The throughput $P_{SCO}$ of the conventional frequency hopping system and the adaptive frequency hopping system for the SCO link is given in accordance with $HV_z$ (HV: High-quality Voice, z=1, 2, 3) of each SCO packet as follows:

$$P_{SCO}=1600/z \cdot P_T, z=1, 2, 3 \qquad (1)$$

where $P_T$ is a probability of successful transmission of the packet. Each $P_T$ for the conventional frequency hopping system and the adaptive frequency hopping system according to the present invention can be expressed as the following equations 2 and 3, respectively.

$$P_T = Ng/Nh \qquad (2)$$

where $Nh=Ng+Nb$.

$$P_T=(Nh-Nb-Nba)/(Nh-Nb+Nga-Nba) \qquad (3)$$

where Nba is the number of occurrence of good channel erroneously estimated as bad channels and Nga is the number of occurrence of bad channels erroneously estimated as good channels.

Meanwhile, the throughput $P_{ACL}$ of the ACL link can be expressed as follows:

$$P_{ACL}=(1600/W) \cdot (P_T^2+P_T^3) \qquad (4)$$

The probability of successful transmission of the packet is $P_T=Ng/Nh$, and W for the conventional frequency hopping system and the adaptive frequency hopping system of the present invention can be expressed as the following equations 5 and 6, respectively.

$$W=x+y \qquad (5)$$

where x and y=1, 3, 5, $$W=2 \cdot (Nb-Nga+Nba)/Nh+(x+y) \cdot (Nh-Nb+Nga-Nba)/Nh \qquad (6)$$

where x and y=3, 5.

Considering the length of the packet, the data rate can be expressed as follows:

$$R_{ACL}=(1600/W) \cdot P_T \cdot (1+P_T) \cdot [(Nba/Nh) \cdot L1+\{(Nh-Nb-Nba)/Nn\} \cdot L_{3/5}] \qquad (7)$$

where $L_{3/5}$ means $L_3$ or $L_5$, and Li is data length of $DM_i$ packet (i=1, 3 or 5).

Figure 3:
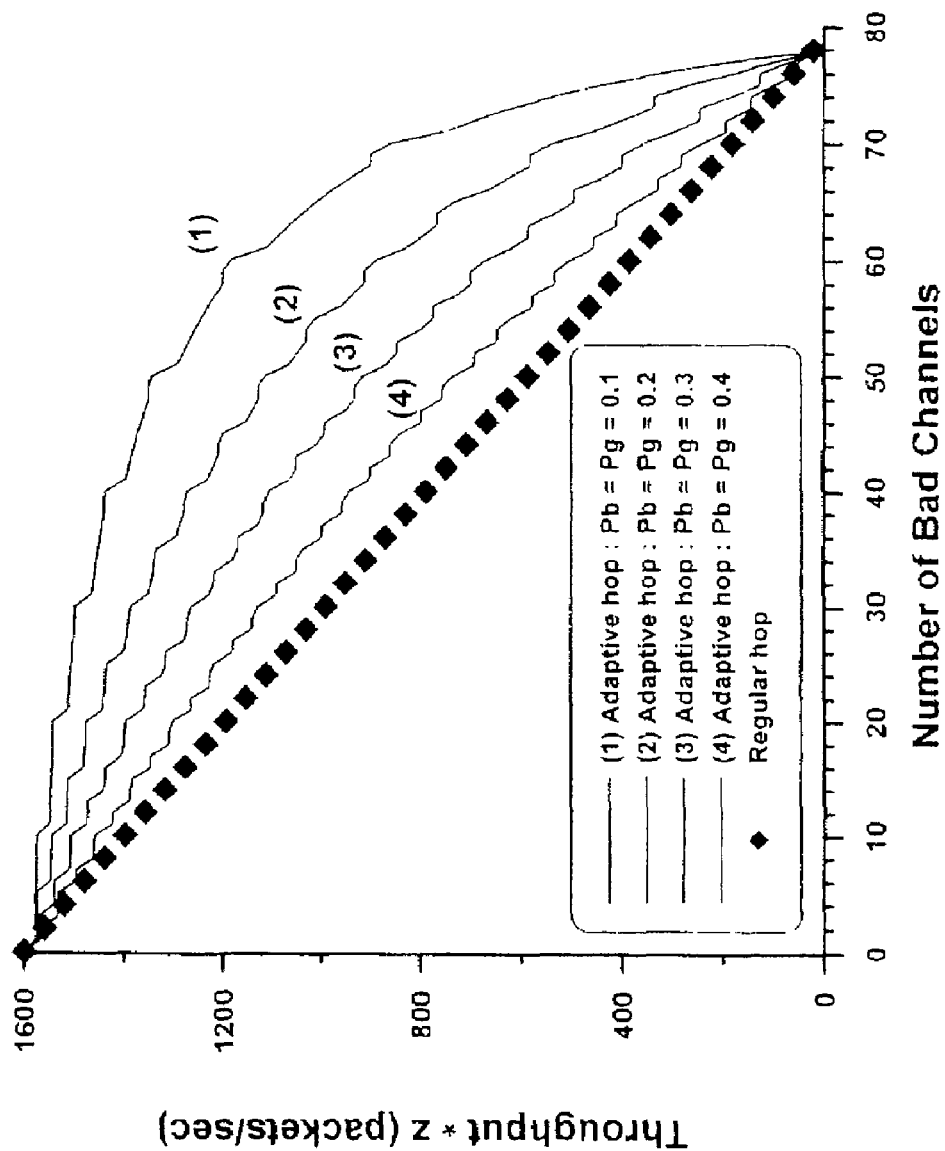
FIG. 3 is a graph illustrating the performance of the adaptive frequency hopping system on the SOC link according to the present invention.
Figure 4:
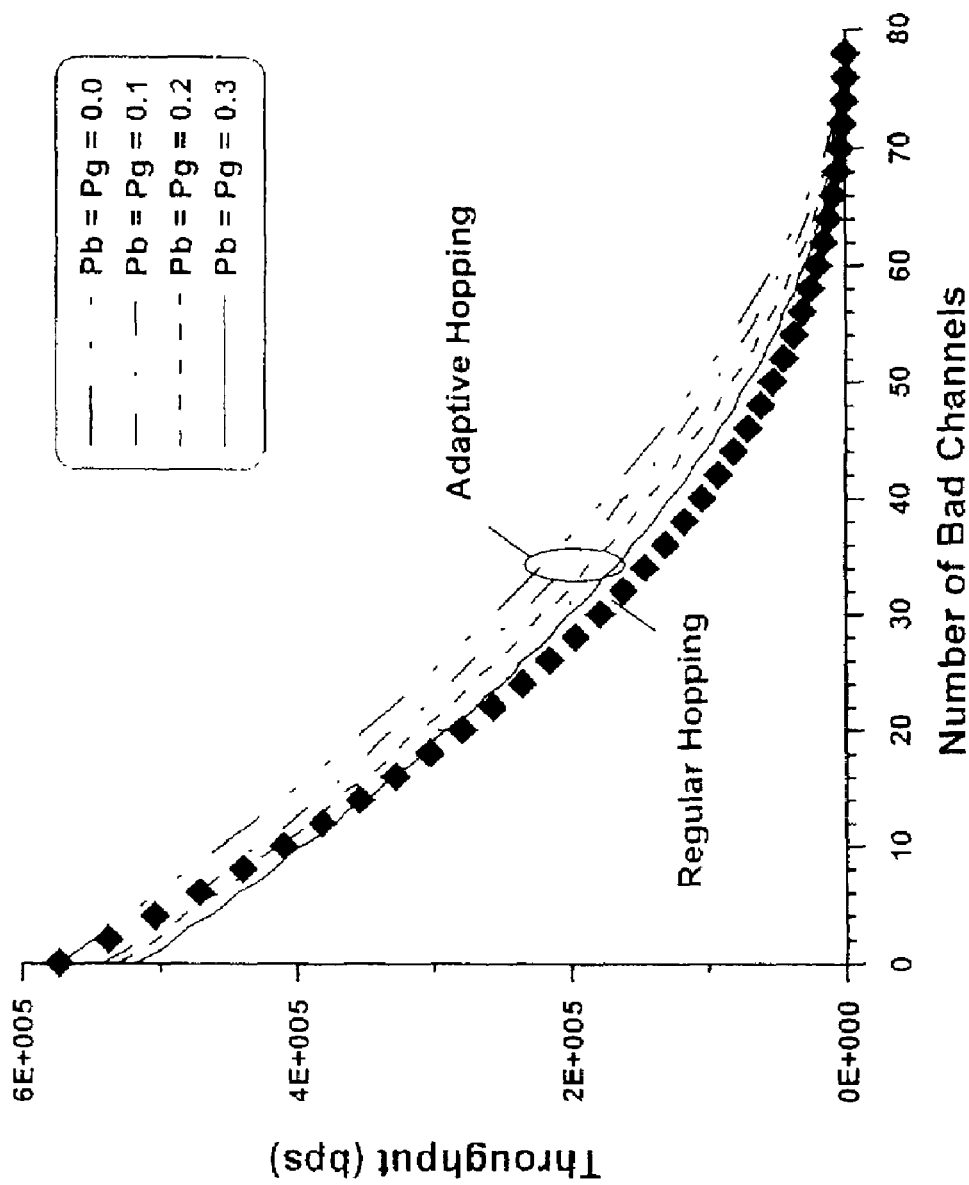
FIG. 4 is a graph illustrating the performance of the adaptive frequency hopping system on the ACL link according to the present invention.

FIGS. 3 and 4 are graphs illustrating the respective performances of the SCO and ACL links. As shown in FIGS. 3 and 4, the adaptive frequency hopping system represents the improved data rate for both the SCO and ACL links. Furthermore, the graphs show that as the channel estimation error Pg=Nba/Ng and Pb=Nga/Nb increase, the data rate decreases.

The proposed adaptive frequency hopping scheme monitors the frequency channel quality so that the transmission packet can be less affected by an interference component. Therefore, the entire data rate can be improved.

What is claimed is:

1. An adaptive frequency hopping apparatus in a wireless personal area network system comprising:
   a frequency table for monitoring each channel quality and for storing and outputting information on each channel quality accumulated therein;

a frequency hopping transceiver for generating and outputting a frequency pattern in accordance with predetermined rules;

a link controller for generating an asynchronous connectionless (ACL) link in accordance with output signals of the frequency table and the frequency hopping transceiver and for controlling selection of an operating mode between a channel avoidance scheme and a channel selection scheme;

a packet handler for generating packet data by integrating a synchronous connection oriented (SCO) link and the ACL link inputted thereinto;

a gaussian frequency shift keying (GFSK) modulator for performing GFSK modulation for signals outputted from the packet handler;

a mode selector for selecting the operating mode between the channel avoidance scheme and the channel selection scheme in accordance with output signals of the frequency hopping transceiver and the link controller;

a frequency synthesizer for synthesizing frequencies in accordance with output signals of the mode selector;

a first multiplier for multiplying signals outputted from the frequency synthesizer and the GFSK modulator and for outputting the multiplied signals as transmission signals;

a second multiplier for multiplying the output signals of the frequency synthesizer by received signals;

an RSSI detector for detecting a RSSI from output signals of the second multiplier;

a GFSK demodulator for performing GFSK demodulation for the output signals of the second multiplier;

a packet handler for restoring packet-type data from output signals of the GFSK demodulator; and a channel quality detector for estimating the channel quality by using the output signals of the RSSI detector and the packet handler, and storing it in the frequency table.

* * * * *